United States Patent
Kang et al.

(10) Patent No.: US 12,117,583 B1
(45) Date of Patent: Oct. 15, 2024

(54) METHOD AND DEVICE FOR MOBILE RAPID EXPLORATION OF MINERAL RESOURCES

(71) Applicant: Institute of Geology and Geophysics, Chinese Academy of Sciences, Beijing (CN)

(72) Inventors: Lili Kang, Beijing (CN); Zhongxing Wang, Beijing (CN); Zhiyao Liu, Beijing (CN); Tianxin Zhang, Beijing (CN); Zihang Li, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/677,971

(22) Filed: May 30, 2024

(30) Foreign Application Priority Data

Oct. 24, 2023 (CN) .......................... 202311382139.2

(51) Int. Cl.
    *G01V 3/16* (2006.01)
    *G01V 3/38* (2006.01)

(52) U.S. Cl.
    CPC . *G01V 3/16* (2013.01); *G01V 3/38* (2013.01)

(58) Field of Classification Search
    CPC .................................. G01V 3/16; G01V 3/38
    (Continued)

(56) References Cited

U.S. PATENT DOCUMENTS

| | | |
|---|---|---|
| 2012/2931770 | 11/2012 | Dodds |
| 2018/0081075 A1* | 3/2018 | Smiarowski ........... G01V 3/165 |

(Continued)

FOREIGN PATENT DOCUMENTS

| | | |
|---|---|---|
| CN | 104865608 A | 8/2015 |
| CN | 111257951 A | 6/2020 |

(Continued)

OTHER PUBLICATIONS

Liu Fubo et al., "EEMD method for removing sensor motion noise in airborne transient electromagnetic system with grounded conductor source," Geophysical and geochemical exploration, Feb. 2017, pp. 123-128, vol. 41, No. 1 (abstract translation on last page).

(Continued)

*Primary Examiner* — Raul J Rios Russo
(74) *Attorney, Agent, or Firm* — Pilloff Passino & Cosenza LLP; Rachel K. Pilloff; Sean A. Passino (57) ABSTRACT

Provided are a method and a device for mobile rapid exploration of mineral resources. The device includes a main magnetic sensor, a slave magnetic sensor and a ground vertical magnetic field sensor arranged in a ground reference station. During exploration, on the one hand, a semi-airborne artificial source exploration method is used to collect signals with the main magnetic sensor and the slave magnetic sensor, in which the slave magnetic sensor collects low-frequency motion noise, and the main magnetic sensor collects low-frequency motion noise and vertical magnetic field signals synchronously. On the other hand, vertical magnetic field signals in a same survey area are collected by the ground vertical magnetic field sensor, and then the low-frequency motion noise collected by the main magnetic sensor is estimated twice through two correlation mappings, so as to obtain a final vertical magnetic field measurement signal.

10 Claims, 8 Drawing Sheets

(58) Field of Classification Search
USPC .......................................................... 324/330
See application file for complete search history.

(56) References Cited

U.S. PATENT DOCUMENTS

2018/0313971 A1* 11/2018 Miles .................... G01R 33/028
2019/0383960 A1* 12/2019 Wang ..................... G01V 3/165

FOREIGN PATENT DOCUMENTS

| | | |
|---|---|---|
| CN | 115097528 A | 9/2022 |
| CN | 115356774 A | 11/2022 |
| CN | 116484177 A | 7/2023 |
| JP | 2002202129 A | 7/2002 |

OTHER PUBLICATIONS

Notice of the First Office Action for China Application No. 202311382139.2, mailed Nov. 29, 2023.
Notification to Grant Patent for China Application No. 202311382139.2, mailed Dec. 8, 2023.
First Search Report for China Application No. 202311382139.2, dated Nov. 23, 2023.
Supplementary Report for China Application No. 202311382139.2, dated Dec. 4, 2023.

* cited by examiner

```
┌─────────────────────────────────────────────────────────────┐
│ Adopting a semi-airborne artificial source detection method │
│ to cooperate with a main magnetic sensor and a slave        │
│ magnetic sensor to collect signals, wherein the slave       │
│ magnetic sensor collects low-frequency motion noise, and    │ — Step 1
│ the main magnetic sensor synchronously collects low-        │
│ frequency motion noise and vertical magnetic field signals; │
│ and collecting vertical magnetic field signals of a same    │
│ survey area through a ground vertical magnetic field sensor │
└─────────────────────────────────────────────────────────────┘
                              ↓
┌─────────────────────────────────────────────────────────────┐
│ Performing correlation mapping of the low-frequency motion  │
│ noise in the main magnetic sensor by using the low-         │
│ frequency motion noise collected by the slave magnetic      │ — Step 2
│ sensor, and completing a primary estimation of the low-     │
│ frequency motion noise of the main magnetic sensor          │
└─────────────────────────────────────────────────────────────┘
                              ↓
┌─────────────────────────────────────────────────────────────┐
│ Performing correlation mapping of a useful signal contained │
│ in the primary estimation of the low-frequency motion noise │
│ of the main magnetic sensor by using the vertical magnetic  │
│ field signals collected by the ground vertical magnetic     │
│ field sensor in the step 1, and then eliminating the useful │ — Step 3
│ signal on a basis of the primary estimation of the low-     │
│ frequency motion noise of the main magnetic sensor obtained │
│ in the step 2 to obtain a secondary estimation of the low-  │
│ frequency motion noise of the main magnetic sensor          │
└─────────────────────────────────────────────────────────────┘
                              ↓
┌─────────────────────────────────────────────────────────────┐
│ Regarding the secondary estimation of the low-frequency     │
│ motion noise of the main magnetic sensor obtained in the    │
│ step 3 as a low-frequency motion noise part in the signals  │
│ collected by the main magnetic sensor in the step 1, so as  │ — Step 4
│ to cancel the low-frequency motion noise of the main        │
│ magnetic sensor, wherein a cancelled signal part is a       │
│ vertical magnetic field signal responded by the main        │
│ magnetic sensor                                             │
└─────────────────────────────────────────────────────────────┘
```

FIG. 5

METHOD AND DEVICE FOR MOBILE RAPID EXPLORATION OF MINERAL RESOURCES

CROSS-REFERENCE TO RELATED APPLICATIONS

This application claims priority to Chinese Patent Application No. 202311382139.2, filed on Oct. 24, 2023, the contents of which are hereby incorporated by reference.

TECHNICAL FIELD

The disclosure belongs to the application field of high-tech mineral exploration, and in particular to a method and a device for mobile rapid exploration of mineral resources, where the exploration method includes a system low-frequency motion noise suppression method based on correlation mapping.

BACKGROUND

Metal mineral resources, especially key metal mineral resources, are the core supporting conditions for the rapid development of national economy. Due to the complex geological and geomorphological conditions, more than ⅔ of the resources are buried in mountainous areas and forest areas with complex topography. In other words, most metal mineral resources are concentrated in deep underground or complex terrain areas, which have not been identified yet. Therefore, it is very important to develop high-tech suitable for deep metal mineral resources exploration in complex terrain areas to identify resource blind areas and realize mineral resources increase and storage.

A semi-airborne electromagnetic exploration method adopts a working mode of high-power emission on the ground and moving in the air to measure the response magnetic field, and is one of the important methods suitable for the metal mineral resources exploration in a second prospecting space in the deep underground or in the complex terrain areas, and has an advantage of deep and rapid exploration. However, the existing semi-airborne electromagnetic exploration system has not fully utilized advantages of ground-based emitters in deep exploration, mainly because the measured vertical magnetic field component signal of the semi-airborne system is weak and decays rapidly with an increase of receiving and sending distance, and the signal-to-noise ratio of the system is low due to the influence of motion noise. Therefore, it is very important to reduce the motion noise of the receiving system and improve the signal-to-noise ratio of the system to improve the exploration depth and accuracy of the system. A main noise source of the semi-airborne electromagnetic exploration system is the low-frequency motion noise introduced into the receiving magnetic sensor during the mobile measurement of the receiving system. The low-frequency motion noise is embodied in the following aspects: a magnetic sensor cuts a magnetic induction line of the geomagnetic field in air movement, and the motion drift that is consistent with the motion frequency of the magnetic sensor is introduced into the magnetic sensor.

Domestic and foreign scholars have carried out a series of researches on the low-frequency motion noise of semi-airborne system. The representative works include: Li Suyi of Jilin University, Li Yuan of Chengdu University of Technology, etc., and studied the methods of removing motion drift by using wavelet transform and empirical mode decomposition respectively, and obtained good attenuation curves and processing results in time domain. Wu Xin, from Institute of Geology and Geophysics, Chinese Academy of Sciences, used artificial intelligence algorithm to deal with the low-frequency motion noise of semi-airborne time-domain system, and achieved good processing results in simulation data.

The above methods are mainly aimed at the situation that the exploration frequency of time-domain system or frequency-domain system is higher than the low-frequency motion noise frequency, and are of no help to the situation that the exploration frequency is the same as the motion noise frequency.

In summary, the existing methods generally deal with the noise of time-domain systems or specific sources, but may not simultaneously remove the motion drift, making it difficult to achieve one-time cancellation of low-frequency motion noise in semi-airborne electromagnetic exploration systems.

To sum up, the existing semi-airborne electromagnetic exploration method has following problems.

1. The existing motion noise removal methods generally deal with the noise of time-domain systems or specific sources, and are powerless to the motion noise with the same frequency or similar frequency (the exploration frequency is the same as the motion drift) in semi-airborne electromagnetic systems.

2. It is difficult to remove or suppress the low-frequency motion drift of the magnetic sensor in the frequency-domain systems.

The existence of the above problems limits the application of semi-airborne electromagnetic exploration method in mineral resources exploration, especially in the exploration target field of low-resistivity ore beds with large buried depth and low resistivity.

SUMMARY

In order to solve the above problems, an objective of the disclosure is to provide a method, a device and an application for mobile rapid exploration of mineral resources to effectively eliminate low-frequency motion noise in a semi-airborne electromagnetic exploration process, improve the exploration depth and exploration accuracy, and meet requirements for rapid exploration of low-resistivity minerals.

In order to achieve the above objective, the disclosure adopts a following technical scheme.

A method for mobile rapid exploration of mineral resources includes following steps:

step 1, on the one hand, adopting a semi-airborne artificial source exploration method to cooperate with a main magnetic sensor and a slave magnetic sensor to collect signals, where the slave magnetic sensor collects low-frequency motion noise, and the main magnetic sensor synchronously collects low-frequency motion noise and vertical magnetic field signals; on the other hand, collecting vertical magnetic field signals of a same survey area through a ground vertical magnetic field sensor;

step 2, performing correlation mapping of the low-frequency motion noise in the main magnetic sensor by using the low-frequency motion noise collected by the slave magnetic sensor, and completing a primary estimation of the low-frequency motion noise of the main magnetic sensor;

step 3, performing correlation mapping of a useful signal contained in the primary estimation of the low-frequency motion noise of the main magnetic sensor by using the vertical magnetic field signals collected by the ground vertical magnetic field sensor in the step 1, and then eliminating the useful signal on a basis of the primary estimation of the low-frequency motion noise of the main magnetic sensor obtained in the step 2 to obtain a secondary estimation of the low-frequency motion noise of the main magnetic sensor; and step 4, regarding the secondary estimation of the low-frequency motion noise of the main magnetic sensor obtained in the step 3 as a low-frequency motion noise part in the signals collected by the main magnetic sensor in the step 1, so as to cancel the low-frequency motion noise of the main magnetic sensor, where a cancelled signal part is a vertical magnetic field signal responded by the main magnetic sensor.

Optionally, the primary estimation of the low-frequency motion noise of the main magnetic sensor in the step 2 is implemented according to a following method:

recording an output $y_1$ of the slave magnetic sensor as reference low-frequency motion noise $b_r$;

recording an output $y_2$ of the main magnetic sensor, including a measured vertical magnetic field signal $b_{zm}$ and measured low-frequency motion noise $b_{rm}$;

then a correlation mapping function $h(n)$ from the slave magnetic sensor to the low-frequency motion noise in the main magnetic sensor satisfies a following relationship: $y_1(n)=b_r(n)$; $y_2(n)=b_{zm}+h(n)*b_r(n)$; and performing Fourier transform on the output $y_1$ of the slave magnetic sensor and the output $y_2$ of the main magnetic sensor to obtain a following formula: $Y_1(\omega)=B_r(\omega)$; $Y_2(\omega) \leq B_{zm}(\omega)+B_r(\omega) \cdot H(\omega)$; then the primary estimation of the low-frequency motion noise of the main magnetic sensor is: $b_n=F^{-1}[B_r(\omega) \cdot H(\omega)]$, where $F^{-1}$ is inverse Fourier transform, and a correlation mapping function $H(\omega)$ from the slave magnetic sensor to the low-frequency motion noise in the main magnetic sensor is calculated as follows:

$$H(\omega) = \frac{S_{Y_1 Y_2}}{S_{RR}},$$

where $S_{RR}$ is a self-power spectrum output by the slave magnetic sensor, and $S_{Y_1 Y_2}$ is a cross-power spectrum output by the slave magnetic sensor and the main magnetic sensor.

Optionally, the secondary estimation of the low-frequency motion noise of the main magnetic sensor in the step 3 is implemented according to a following method:

recording an output $y_3$ of the ground vertical magnetic field sensor as a measured vertical magnetic field signal $b_s$;

recording the primary estimation of the low-frequency motion noise of the main magnetic sensor as $y_4$ and the secondary estimation as $b_{ns}$, then a correlation mapping function $h_2(n)$ from the ground vertical magnetic field sensor to the vertical magnetic field signals in the primary estimation of the low-frequency motion noise satisfies a following relationship: $y_3(n)=b_s(n)$; $y_4(n)=b_n=b_{ns}+h_2(n)*b_s(n)$; then the secondary estimation of the low-frequency motion noise of the main magnetic sensor is obtained as follows: $Y_3(\omega)=B_s(\omega)$; $Y_4(\omega)=B_n=B_{ns}(\omega)+B_s(\omega) \cdot H_2(\omega)$; then the secondary estimation of the low-frequency motion noise of the main magnetic sensor is obtained as follows: $b_{ns}=F^{-1}[B_n-B_s(\omega) \cdot H_2(\omega)]$, where $F^{-1}$ is inverse Fourier transform, and a correlation mapping function $H_2(\omega)$ from the ground vertical magnetic field sensor to the vertical magnetic field signals in the primary estimation of the low-frequency motion noise is calculated as follows:

$$H_2(\omega) = \frac{S_{Y_3 Y_4}}{S_{SS}},$$

where $S_{SS}$ is a self-power spectrum of the vertical magnetic field signals collected by the ground vertical magnetic field sensor, and $S_{Y_3 Y_4}$ is a cross-power spectrum of the primary estimation of the low-frequency motion noise and the vertical magnetic field signals collected by the ground vertical magnetic field sensor.

In an embodiment, in the step 1, frequencies of collected vertical magnetic field signals include 1 hertz (Hz)-100 kilohertz (kHz).

In an embodiment, the method for mobile rapid exploration of mineral resources is applied to exploration of low-resistivity ore beds, and a buried depth of the low-resistivity ore beds ranges from 0 meter (m) to 500 m and from 500 m to 800 m. For ore beds with a buried depth of 0 m-500 m, both the method according to the disclosure and an existing semi-airborne electromagnetic exploration method may be adopted. For ore beds with a buried depth of 500 m-800 m, the method according to the disclosure should be adopted.

A device for mobile rapid exploration of mineral resources includes, the main magnetic sensor and the slave magnetic sensor used for air movement measurement, where the main magnetic sensor and the slave magnetic sensor are arranged in a non-coaxial and non-coplanar manner, bandwidths of the main magnetic sensor and the slave magnetic sensor are consistent, and exploration resolution of the slave magnetic sensor may only distinguish the low-frequency motion noise, but may not distinguish real vertical magnetic field signals, and exploration resolution of the main magnetic sensor may simultaneously distinguish the real vertical magnetic field signals and the low-frequency motion noise; and a ground reference station fixed on a ground, where the ground reference station includes the ground vertical magnetic field sensor for collecting the vertical magnetic field signals.

Optionally, both the main magnetic sensor and the slave magnetic sensor are coils, the main magnetic sensor is recorded as a measuring coil and the slave magnetic sensor is recorded as a reference coil, and the reference coil is bridged on the measuring coil, and an outer diameter of the reference coil is much smaller than an outer diameter of the measuring coil.

Optionally, the reference coil is bridged on the measuring coil through reference coil supports and reference coil fixing rings, where the reference coil supports are used for maintaining an outline of the reference coil and the reference coil fixing rings are used for fixing bridging points between the reference coil and the measuring coil.

Optionally, the measuring coil and the reference coil are both square or circular.

Optionally, the measuring coil and the reference coil are simultaneously connected to an unmanned aerial vehicle or a helicopter; and a layout position of the ground reference station meets layout requirements of a receiver position in a controlled source magnetotelluric observation method.

Compared with the prior art, the disclosure following characteristics.

Firstly, a low-frequency motion noise processing method according to the disclosure is effective for both semi-airborne time-domain electromagnetic method and frequency-domain electromagnetic method.

Secondly, the correlation prediction for measuring the low-frequency motion noise of the main magnetic sensor may be realized by other correlation prediction methods besides a correlation reference method.

Thirdly, the devices and the method according to the disclosure suppress an influence of the low-frequency motion noise. On the one hand, the exploration depth of mineral resources exploration may be improved, so as to realize the exploration of mineral resources with large buried depth. On the other hand, it is helpful to improve the exploration accuracy of the system, so as to realize the exploration of mineral resources with low resistivity. For example, a low-resistivity mineral distribution layer with a depth of 600 meters and a thickness of 10 meters may not be detected if the influence of the low-frequency motion noise is not eliminated, but the low-resistivity mineral distribution layer may be clearly reflected after the influence is eliminated by the disclosure.

BRIEF DESCRIPTION OF THE DRAWINGS

FIG. 5 is a flow chart of a method for mobile rapid exploration of mineral resources according to the disclosure.

DETAILED DESCRIPTION OF THE EMBODIMENTS

The disclosure will be further described with reference to attached drawings and specific embodiments, but it should not be understood that the scope of the subject matter of the disclosure is limited to the following embodiments, and all kinds of modifications, substitutions and changes made according to the common technical knowledge and common means in the field are included in the scope of the disclosure without departing from the above technical ideas of the disclosure.

Figure 1:
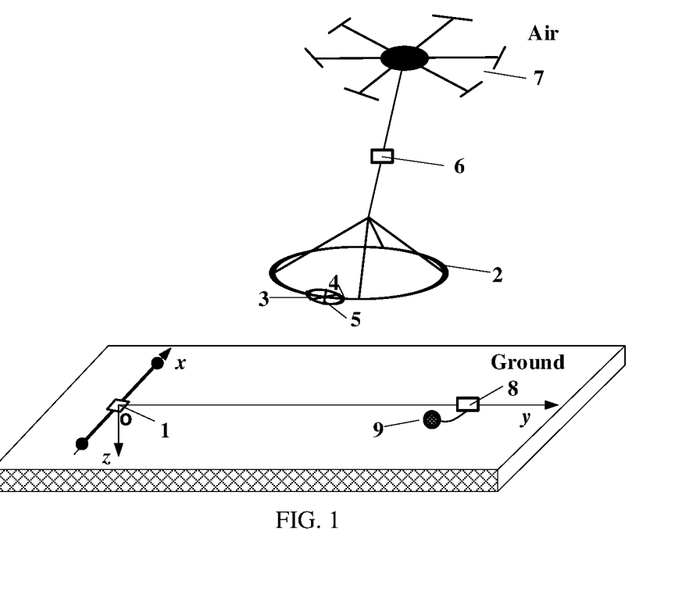
FIG. 1 is a schematic composition diagram of a device for mobile rapid exploration of mineral resources in the disclosure.

As shown in FIG. 1, the device for mobile rapid exploration of mineral resources in this embodiment is mainly composed of a ground emission source 1, a measuring coil 2 as a main magnetic sensor, a reference coil 3 as a slave magnetic sensor, reference coil supports 4, reference coil fixing rings 5, an airborne suspension platform 6, an unmanned aerial vehicle 7, a ground reference station 8 and a ground vertical magnetic field sensor 9.

The measuring coil 2 and the reference coil 3 are both circular coils, and are connected by rigid bridging to form a measuring coil, where the reference coil 3 is fixed at two bridging points on a circumference of the measuring coil 2 by the reference coil fixing rings 5, and an inner circumference of the reference coil 3 is supported from an inside to an outside by the two radially arranged reference coil supports 4 to keep an outline of the reference coil 3. The reference coil 3 and the measuring coil 2 have a same bandwidth, and exploration resolution of the reference coil 3 may only distinguish low-frequency motion noise, but may not distinguish real vertical magnetic field signals. Exploration resolution of the measuring coil 2 may simultaneously distinguish real vertical magnetic field signals and low-frequency motion noise, and an outer diameter of the reference coil 3 is much smaller than an outer diameter of the measuring coil 2. The measuring coil is connected to the unmanned aerial vehicle 7 through the airborne suspension platform 6.

The position setting of the ground reference station 8 should meet requirements of a receiver position in a conventional controlled source magnetotelluric observation scheme, that is, the ground reference station 8 should be arranged within an angle range of 600 left and right of a vertical line in the ground emission source 1, and a vertical distance from the ground emission source 1 is more than 5 times a skin depth. For example, for a exploration task with a lowest frequency of 10 Hz, assuming that an average earth resistivity is 100 ohm meters, a vertical distance between the ground reference station 8 and the ground emission source 1 should be more than 7.9 kilometers. In addition, it should be ensured that the ground reference station 8 has strong signal and small interference, and a signal-to-noise ratio is higher than 20 decibel (dB), so that three-component magnetic field signals with high signal-to-noise ratios may be measured.

When the semi-airborne electromagnetic exploration system is used to quickly explore low-resistivity mineral resources, as shown in FIG. 5, a method includes following steps:

step 1, using the unmanned aerial vehicle 7 to collect signals in cooperation with a exploration coil, where the reference coil 3 collects low-frequency motion noise, the measuring coil 2 collects low-frequency motion noise and vertical magnetic field signals synchronously; and on the other hand, collecting vertical magnetic field signals of a same survey area by the ground vertical magnetic field sensor 9 in the ground reference station 8;

step 2, performing correlation mapping of the low-frequency motion noise in the measuring coil 2 by using the low-frequency motion noise collected by the reference coil 3, and completing a primary estimation of the low-frequency motion noise of the measuring coil 2;

step 3, performing correlation mapping of a useful signal contained in the primary estimation of the low-frequency motion noise of the measuring coil 2 by using the vertical magnetic field signals collected by the ground vertical magnetic field sensor 9 in the step 1, and then eliminating the useful signal on a basis of the primary estimation of the low-frequency motion noise of the measuring coil 2 obtained in the step 2 to obtain a secondary estimation of the low-frequency motion noise of the measuring coil 2;

step 4, regarding the secondary estimation of the low-frequency motion noise of the measuring coil 2 obtained in the step 3 as a low-frequency motion noise part in the signals collected by the measuring coil 2 in the step 1, so as to cancel the low-frequency motion noise of the measuring coil 2, where a cancelled signal part is a vertical magnetic field signal responded by the measuring coil 2.

Specific algorithms for the primary estimation and the secondary estimation of the low-frequency motion noise of the measuring coil 2 are as follows:

assuming that an output $y_1$ of the reference coil 3 is reference low-frequency motion noise $b_r$, and an output $y_2$ of the measuring coil 2 is a noisy signal, including a measured vertical magnetic field signal $b_{zm}$ and measured low-frequency motion noise $b_{rm}$, and a correlation mapping function $h(n)$ from the reference coil 3 to the low-frequency motion noise in the measuring coil 2 satisfies:

$$y_1(n)=b_r(n) \tag{1}$$

$$y_2(n)=b_{zm}+h(n)*b_r(n) \tag{2};$$

performing Fourier transform on the outputs of the reference coil 3 and the measuring coil 2 to obtain:

$$Y_1(\omega)=B_r(\omega) \tag{3}$$

$$Y_2(\omega)=B_{zm}(\omega)+B_r(\omega)\cdot H(\omega) \tag{4};$$

calculating a self-power spectrum $S_{RR}$ output by the reference coil 3 and a cross-power spectrum $S_{Y_1Y_2}$ output by the reference coil 3 and the measuring coil 2 respectively. When output data of the reference coil 3 is motion noise irrelevant to the signal, a cross-power spectrum $S_{RZM}$ of the measured low-frequency motion noise and the measured vertical magnetic field signal is 0. At this time, the cross-power spectrum satisfies:

$$S_{Y_1Y_2} = S_{RZM} + H(\omega) \cdot S_{RR} \tag{5}$$
$$= H(\omega) \cdot S_{RR}$$

Therefore, a low-frequency motion noise correlation mapping function $H(\omega)$ may be estimated adaptively according to the cross-power spectrum of the reference coil 3 and the measuring coil 2 and the self-power spectrum output by the reference coil 3:

$$H(\omega) = \frac{S_{Y_1Y_2}}{S_{RR}}. \tag{6}$$

It may be known that a signal after the measuring coil 2 cancels the low-frequency motion noise is:

$$b_{zm}(n)=F^{-1}[Y_2(\omega)-B_r(\omega)\cdot H(\omega)] \tag{7}$$

where $F^{-1}$ is inverse Fourier transform, $B_n=B_r(\omega)\cdot H(\omega)$ is a frequency spectrum of the primary estimation of the low-frequency motion noise, and a primary estimation of corresponding time-domain low-frequency motion noise is:

$$b_n=F^{-1}[B_r(\omega)\cdot H(\omega)] \tag{8}.$$

Considering that when a signal intensity is large, the signal may be picked up by the reference coil 3, $B_n$ may contain a leakage of the useful signal. Therefore, the primary estimation of the low-frequency motion noise is subjected to ground station reference processing to obtain a secondary estimation result of the low-frequency motion noise, and a specific processing process is as follows: by applying a correlation reference method between the reference coil 3 and the measuring coil 2, a primary estimation result of the low-frequency motion noise and data obtained by the ground vertical magnetic field sensor 9 in the ground reference station 8 are subjected to correlation reference processing to recover signals lost in noise estimation. A signal obtained by the ground vertical magnetic field sensor 9 in the ground reference station 8 is defined as $b_s$, and the primary estimation of the low-frequency motion noise includes two parts: the secondary estimation $b_{ns}$ of the low-frequency motion noise and the leakage of the useful signal, and the leaked signal is related to the signal obtained by the ground vertical magnetic field sensor 9 in the ground reference station 8, and a mapping function is $h_2(n)$, that is, a following relationship is satisfied:

$$y_3(n)=b_s(n) \tag{9}$$

$$y_4(n)=b_n=b_{ns}+h_2(n)*b_s(n) \tag{10}.$$

Correlation mapping steps are repeated for $y_3$ and $y_4$, and a formula (3) to a formula (6) are referred to obtain:

$$H_2(\omega) = \frac{S_{Y_3Y_4}}{S_{SS}}, \tag{11}$$

where $S_{Y_3Y_4}$ is a cross-power spectrum of the primary estimation of the low-frequency motion noise and the vertical magnetic field response of the ground reference, and $S_{SS}$ is a self-power spectrum of the vertical magnetic field signal (data) obtained by the ground vertical magnetic field sensor 9 in the ground reference station 8.

Therefore, the useful signal in the primary estimation of the low-frequency motion noise is:

$$b_{sr}=F^{-1}[B_s(\omega)\cdot H_2(\omega)] \tag{12}, and$$

the secondary estimation of the low-frequency motion noise is:

$$b_{ns}=F^{-1}[B_n-B_s(\omega)\cdot H_2(\omega)] \tag{13},$$

Finally, a vertical magnetic field response signal of the measuring coil 2 after the secondary estimation to cancel the low-frequency motion noise is obtained:

$$b_{zs}=y_2-b_{ns}=b_{zm}+b_{sr} \tag{14}.$$

Figure 2:
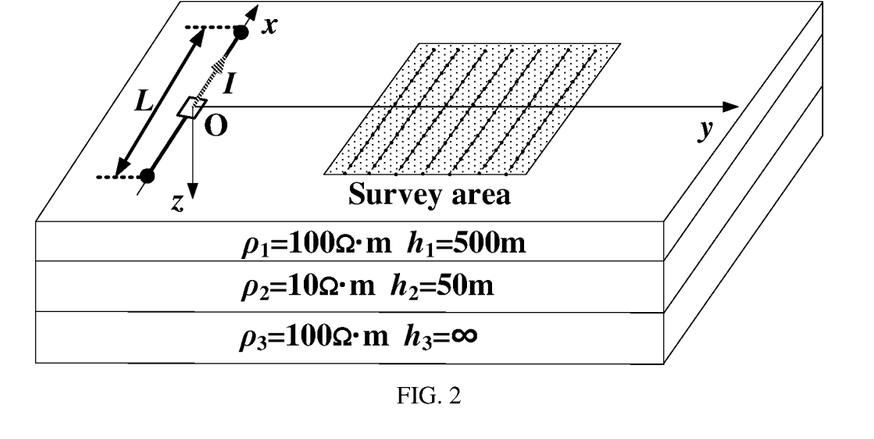
FIG. 2 is diagram of a three-layer earth model.

In order to verify the effectiveness of the disclosure, modeling processing is carried out in a simulation way. As shown in FIG. 2, there is a three-layer earth model, in which a specific meaning of the model is: in an earth with 100 ohm meters of surrounding rock, there is a low-resistivity ore bed with a thickness of 50 meters and a resistivity of 10 ohm meters at a buried depth of 500 meters.

Figure 3A:
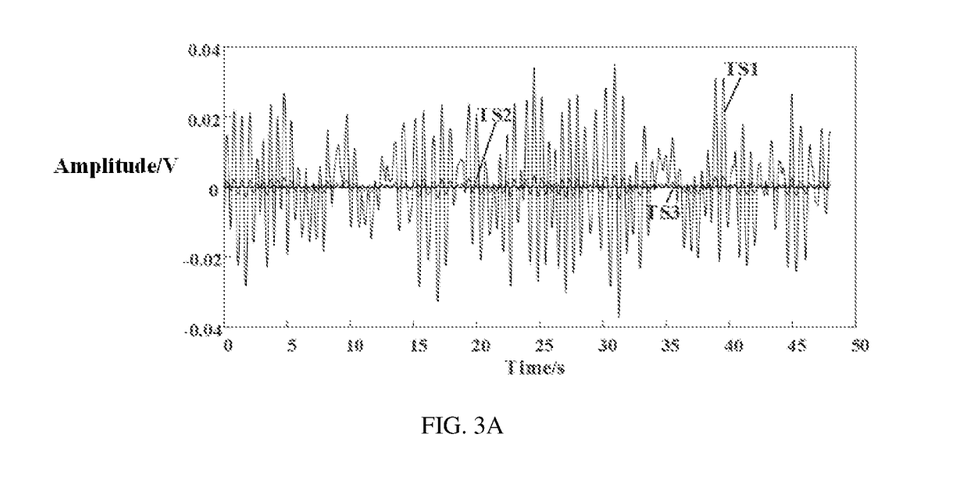
FIG. 3A is a time series diagram of response voltage.

There are three curves in FIG. 3A: curve TS1 is the time series of response voltage of the measuring coil 2, curve TS2 is the time series of response voltage of the reference coil 3, and curve TS3 is the time series of response voltage after denoising.

Figure 3B:
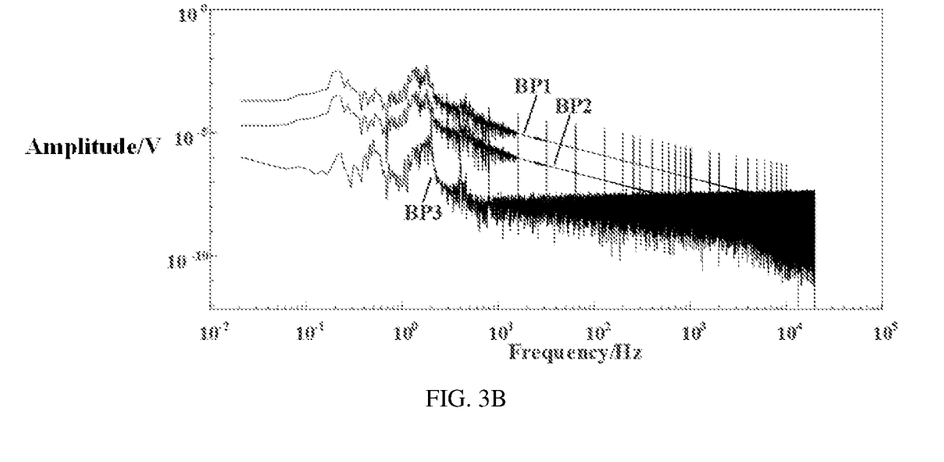
FIG. 3B is a spectrum diagram of response voltage.

There are three curves in FIG. 3B: curve BP1 is the response voltage spectrum of the measuring coil 2, curve BP2 is the response voltage spectrum of the reference coil 3, and curve BP3 is the response voltage spectrum after denoising.

Through the comparison in FIG. 3A and FIG. 3B, it may be seen that the signal-to-noise ratio of magnetic field data is obviously improved after denoising, especially in a low frequency band less than 10 Hz, which is most obviously affected by the low frequency noise. At simulated exploration frequencies of 1 Hz, 2 Hz, 4 Hz and 8 Hz, before denoising, the signal-to-noise ratio is less than 10 dB, which may not meet requirements of conventional magnetic field data measurement accuracy. After denoising, the signal-to-noise ratios are −32 dB, −43 dB, −73 dB and −70 dB respectively, and the signal-to-noise ratios are all higher than 20 dB, which meets the requirements of conventional magnetic field data measurement accuracy. From the perspective of original magnetic field signal measurement, the effectiveness of the technical scheme of the disclosure is illustrated.

Figure 4A:
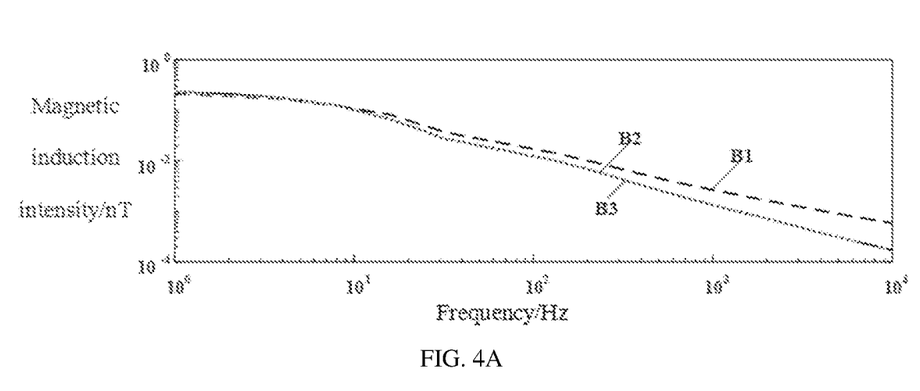
FIG. 4A is a comparison diagram of magnetic induction intensity curves before and after denoising according to the disclosure.

FIG. 4A: Comparison of magnetic induction intensity curves before and after denoising. Curve B1 is a magnetic induction intensity curve of the measuring coil 2, curve B2 is an ideal magnetic induction intensity curve, and curve B3 is a magnetic induction intensity curve after denoising.

Figure 4B:
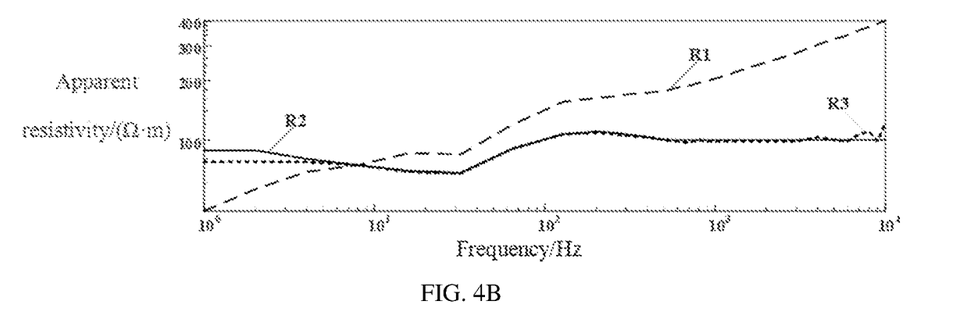
FIG. 4B is a comparison diagram of apparent resistivity curves before and after denoising according to the disclosure.

FIG. 4B: Comparison of apparent resistivity curves before and after denoising. Curve R1 is an apparent resistivity curve of the measuring coil 2, curve R2 is an ideal apparent resistivity curve, and curve R3 is an apparent resistivity curve after denoising.

Figure 4C:
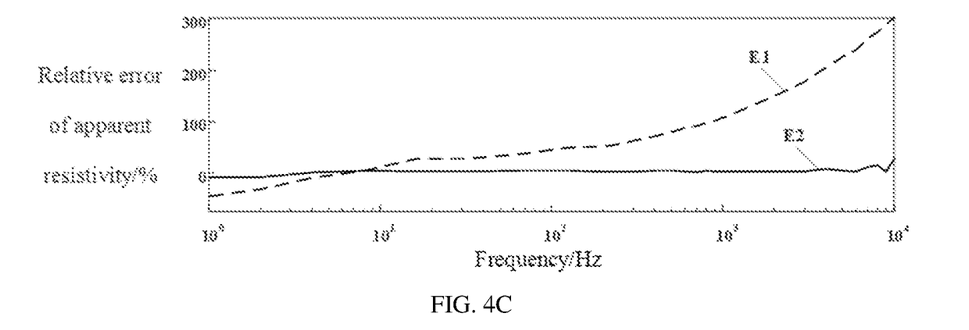
FIG. 4C is a comparison diagram of relative error curves of apparent resistivity before and after denoising according to the disclosure.

FIG. 4C: Relative error curves of apparent resistivity before and after denoising. Curve E1 shows relative errors of apparent resistivity with noise, and curve E2 shows relative errors of apparent resistivity after denoising.

It may be seen from FIG. 4A to FIG. 4C that the magnetic induction intensity curve and the apparent resistivity curve obtained after denoising are closer to ideal model curves, and the apparent resistivity curves before denoising show a decreasing trend from high frequency to low frequency (a corresponding depth is from shallow to deep). False anomalies are introduced, so a three-layer structure in a model shown in FIG. 2. After denoising, the apparent resistivity curve appears flat areas at both ends. In a middle frequency band of 1000-10 Hz, the apparent resistivity first increases and then decreases, and a lowest value is lower than the apparent resistivity in the flat areas at both ends. The apparent resistivity curve conforms to a response law of a general three-layer model. Therefore, comparing the curves before and after denoising, it may be determined that the system may not detect the low-resistivity ore bed with a buried depth of 500 meters and a thickness of 50 meters before denoising, but the system may obviously detect the low-resistivity ore bed after denoising. In an embodiment, from the perspective of apparent resistivity imaging results, the effectiveness and advancement of this scheme are verified.

To sum up, the system and the method provided by the disclosure may realize rapid exploration of mineral resources, and further improve the exploration accuracy of the system compared with traditional schemes.

What is claimed is:

1. A method for mobile rapid exploration of mineral resources, comprising following steps:

step 1, on one hand, adopting a semi-airborne artificial source exploration method to cooperate with a main magnetic sensor and a slave magnetic sensor to collect signals, wherein the slave magnetic sensor collects low-frequency motion noise, and the main magnetic sensor synchronously collects low-frequency motion noise and vertical magnetic field signals; on an other hand, collecting vertical magnetic field signals of a same survey area through a ground vertical magnetic field sensor;

step 2, performing correlation mapping of the low-frequency motion noise in the main magnetic sensor by using the low-frequency motion noise collected by the slave magnetic sensor, and completing a primary estimation of the low-frequency motion noise of the main magnetic sensor;

step 3, performing correlation mapping of a useful signal contained in the primary estimation of the low-frequency motion noise of the main magnetic sensor by using the vertical magnetic field signals collected by the ground vertical magnetic field sensor in the step 1, and then eliminating the useful signal on a basis of the primary estimation of the low-frequency motion noise of the main magnetic sensor obtained in the step 2 to obtain a secondary estimation of the low-frequency motion noise of the main magnetic sensor; and step 4, regarding the secondary estimation of the low-frequency motion noise of the main magnetic sensor obtained in the step 3 as a low-frequency motion noise part in the signals collected by the main magnetic sensor in the step 1, so as to cancel the low-frequency motion noise of the main magnetic sensor, wherein a cancelled signal part is a vertical magnetic field signal responded by the main magnetic sensor.

2. The method for mobile rapid exploration of mineral resources according to claim 1, wherein the primary estimation of the low-frequency motion noise of the main magnetic sensor in the step 2 is implemented according to a following method:

recording an output $y_1$ of the slave magnetic sensor as reference low-frequency motion noise $b_r$;

recording an output $y_2$ of the main magnetic sensor, comprising a measured vertical magnetic field signal $b_{zm}$ and measured low-frequency motion noise $b_{rm}$;

then a correlation mapping function h(n) from the slave magnetic sensor to the low-frequency motion noise in the main magnetic sensor satisfies a following relationship:

$$y_1(n)=b_r(n);$$

$$y_2(n)=b_{zm}+h(n)*b_r(n);\text{ and}$$

performing Fourier transform on the output $y_1$ of the slave magnetic sensor and the output $y_2$ of the main magnetic sensor to obtain a following formula:

$$Y_1(\omega) = B_r(\omega);$$

$$Y_2(\omega) = B_{zm}(\omega) + B_r(\omega)\cdot H(\omega);$$

then the primary estimation of the low-frequency motion noise of the main magnetic sensor is:

$$b_n=F^{-1}[B_r(\omega)\cdot H(\omega)];$$

wherein $F^{-1}$ is inverse Fourier transform, and a correlation mapping function H(ω) from the slave magnetic sensor to the low-frequency motion noise in the main magnetic sensor is calculated as follows:

$$H(\omega) = \frac{S_{Y_1 Y_2}}{S_{RR}};$$

wherein $S_{RR}$ is a self-power spectrum output by the slave magnetic sensor, and $S_{Y_1Y_2}$ is a cross-power spectrum output by the slave magnetic sensor and the main magnetic sensor.

3. The method for mobile rapid exploration of mineral resources according to claim 1, wherein the secondary estimation of the low-frequency motion noise of the main magnetic sensor in the step 3 is implemented according to a following method:

recording an output $y_3$ of the ground vertical magnetic field sensor as a measured vertical magnetic field signal $b_s$;

recording the primary estimation of the low-frequency motion noise of the main magnetic sensor as $y_4$ and the secondary estimation as $b_{ns}$, then a correlation mapping function $h_2(n)$ from the ground vertical magnetic field sensor to the vertical magnetic field signals in the primary estimation of the low-frequency motion noise satisfies a following relationship:

$$y_3(n) = b_s(n);$$

$$y_4(n) = b_n = b_{ns} + h_2(n) * b_s(n);$$

performing Fourier transform of the output $y_3$ of the ground vertical magnetic field sensor and the primary estimation $y_4$ of the low-frequency motion noise of the main magnetic sensor to obtain a following formula:

$$Y_3(\omega) = B_s(\omega);$$

$$Y_4(\omega) = B_n = B_{ns}(\omega) + B_s(\omega) \cdot H_2(\omega);$$

then the secondary estimation of the low-frequency motion noise of the main magnetic sensor is obtained as follows:

$$b_{ns} = F^{-1}[B_n - B_s(\omega) \cdot H_2(\omega)];$$

wherein $F^{-1}$ is inverse Fourier transform, a correlation mapping function $H_2(\omega)$ from the ground vertical magnetic field sensor to the vertical magnetic field signals in the primary estimation of the low-frequency motion noise is calculated as follows:

$$H_2(\omega) = \frac{S_{Y_3 Y_4}}{S_{SS}};$$

wherein $S_{SS}$ is a self-power spectrum of the vertical magnetic field signals collected by the ground vertical magnetic field sensor, and $S_{Y_3 Y_4}$ is a cross-power spectrum of the primary estimation of the low-frequency motion noise and the vertical magnetic field signals collected by the ground vertical magnetic field sensor.

4. The method for mobile rapid exploration of mineral resources according to claim 1, wherein in the step 1, frequencies of collected vertical magnetic field signals comprise 1 Hz-100 kHz.

5. The method for mobile rapid exploration of mineral resources according to claim 1, wherein the method for mobile rapid exploration of mineral resources is applied to exploration of low-resistivity ore beds, and a buried depth of the low-resistivity ore beds ranges from 0 m to 500 m and from 500 m to 800 m.

6. The method for mobile rapid exploration of mineral resources according to claim 1, wherein:

in the step 1, adopted devices for exploration comprise the main magnetic sensor and the slave magnetic sensor used for air movement measurement, and the main magnetic sensor and the slave magnetic sensor are arranged in a non-coaxial and non-coplanar manner, wherein bandwidths of the main magnetic sensor and the slave magnetic sensor are consistent, and exploration resolution of the slave magnetic sensor is only able to distinguish the low-frequency motion noise, but is not able to distinguish real vertical magnetic field signals, and exploration resolution of the main magnetic sensor is able to simultaneously distinguish the real vertical magnetic field signals and the low-frequency motion noise; and in the step 1, the adopted devices for exploration comprise a ground reference station fixed on a ground, and the ground reference station comprises the ground vertical magnetic field sensor for collecting the vertical magnetic field signals.

7. The method for mobile rapid exploration of mineral resources according to claim 6, wherein both the main magnetic sensor and the slave magnetic sensor are coils, the main magnetic sensor is recorded as a measuring coil and the slave magnetic sensor is recorded as a reference coil, and the reference coil is bridged on the measuring coil, and an outer diameter of the reference coil is much smaller than an outer diameter of the measuring coil.

8. The method for mobile rapid exploration of mineral resources according to claim 7, wherein the reference coil is bridged on the measuring coil through reference coil supports and reference coil fixing rings, wherein the reference coil supports are used for maintaining an outline of the reference coil and the reference coil fixing rings are used for fixing bridging points between the reference coil and the measuring coil.

9. The method for mobile rapid exploration of mineral resources according to claim 7, wherein the measuring coil and the reference coil are both square or circular.

10. The method for mobile rapid exploration of mineral resources according to claim 7, wherein the measuring coil and the reference coil are simultaneously connected to an unmanned aerial vehicle or a helicopter;

a layout position of the ground reference station meets layout requirements of a receiver position in a controlled source magnetotelluric observation method.

\* \* \* \* \*